J. STEVENS.
Cotton Gin.
No. 48,032.
Patented May 30, 1865.
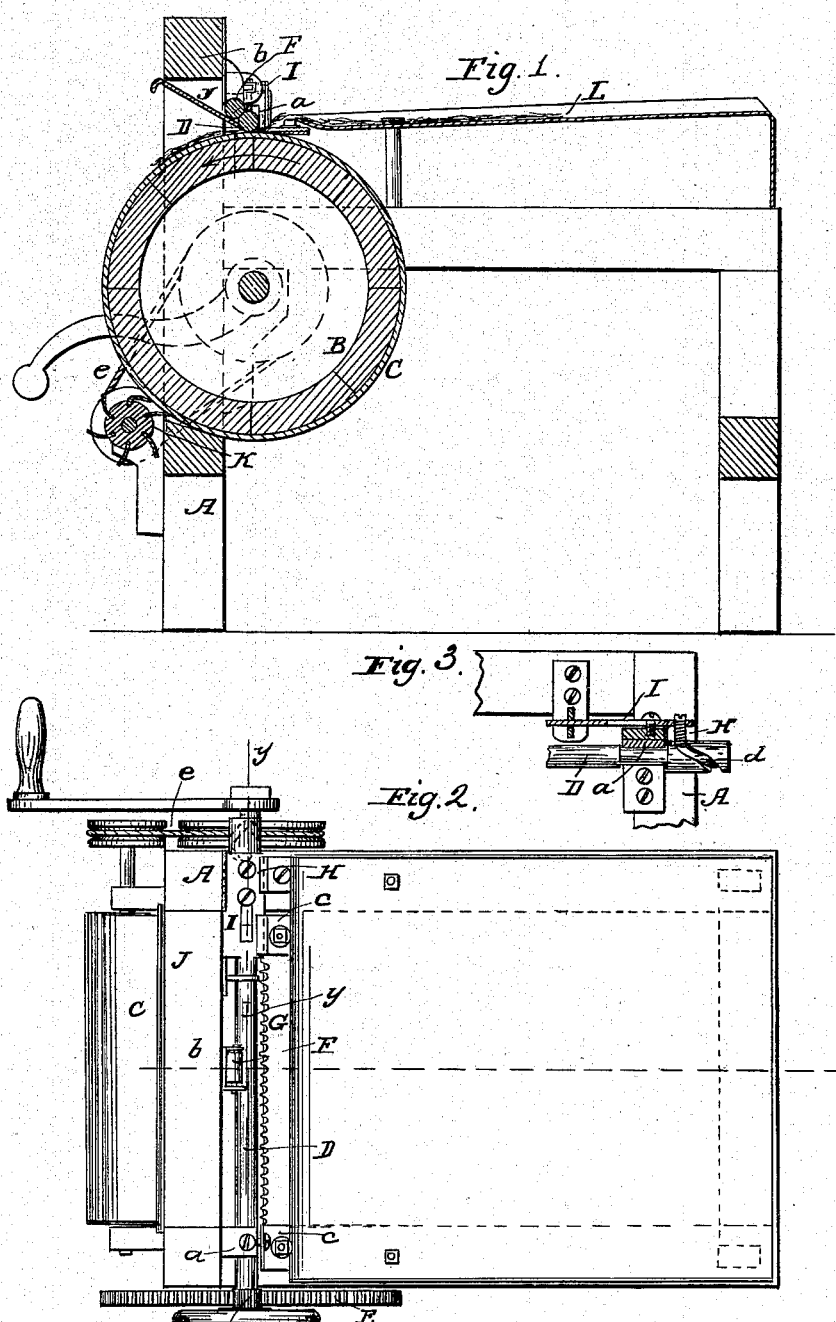

UNITED STATES PATENT OFFICE.

JOHN STEVENS, OF NEW YORK, N. Y., ASSIGNOR TO HIMSELF AND THEODORE BOURNE, OF SAME PLACE.

IMPROVEMENT IN COTTON-GINS.

Specification forming part of Letters Patent No. 48,032, dated May 30, 1865.

*To all whom it may concern:*

Be it known that I, JOHN STEVENS, of the city, county, and State of New York, have invented a new and Improved Cotton-Gin; and I do hereby declare that the following is a full, clear, and exact description thereof, which will enable others skilled in the art to make and use the same, reference being had to the acompanying drawings, forming part of this specification, in which—

Figure 1 is a side sectional view of my invention, taken in the line *x x*, Fig. 2; Fig. 2, a plan or top view of the same; Fig. 3, a vertical section of a portion of the same, taken in the line *y y*, Fig. 2.

Similar letters of reference indicate like parts.

This invention relates to a new and useful improvement in the roller cotton-gin; and it consists in the employment or use of a large or main cylinder covered with leather or other suitable material, in connection with a small metal roller and a laterally-reciprocating plate, all arranged to operate in such a manner that the large or main cylinder will not be injured by the pressure of the cotton-seeds upon it—a contingency to which the ordinary roller gins are liable—and the work of ginning the cotton may be performed expeditiously and in a perfect manner.

A represents a rectangular framing, which may be constructed in any proper manner to support the working parts, and B represents the large or main cylinder, constructed of wood or other suitable material, and covered with leather, C, or other substance which will admit of a slight degree of elasticity at its periphery, or render it soft or cushion-like.

Directly above the cylinder B there is fitted in suitable bearings, *a*, a metal roller, D, which is quite small in diameter compared with the cylinder B. This roller works in contact with the cylinder, and may receive its motion solely from it through the medium of friction; but in order to avoid the contingency of slipping, it would properly be advisable to have the cylinder and roller connected by gears E E′, the latter differing in diameter proportionably to the former. The roller D, in order to prevent its springing, has at its center and above its axis a small roller, F, bearing upon it. This roller is fitted in a box or in bearings attached to a cross-piece, *b*, of the framing.

G represents a horizontal plate, which is placed above the cylinder B and fitted in suitable guides, *c*, which hold it in a proper relative position with the cylinder and admit of its being vibrated laterally. This plate has its front edge quite close to the "bite" formed by the cylinder B and the roller D, as shown in Fig. 1, and it is vibrated by means of a screw or pin, H, which extends down from a plate, I, at one end of plate G, and is fitted in an oblique groove, *d*, near one end of roller D. (See Figs. 1 and 3.) The upper edge of the plate G, near the roller D, is serrated, as shown clearly in Fig. 2.

J is an oblique plate placed in the upper part of the framing A and having its lower edge in contact with the roller D, said plate extending the whole length of the roller and serving as a doffer to strip the cotton therefrom. A rotary doffer, K, strips the cotton from the cylinder B. This doffer receives its motion by a belt, *e*, from the shaft of cylinder B.

L is a feed-board from which the cotton is fed to the roller and cylinder. The cotton is drawn between the cylinder B and roller D, while the seed, owing to the small angle between the plate G and roller D, are repelled and pass under the discharge end of the feed-board. The plate G serves to protect the cylinder B from the pressure of the seed as the seed rest upon it while the cotton is stripped from them, and said plate also serves to ripple the seed from the cotton and promote their free discharge from the gin. By having the front edge of the plate G serrated, it is enabled to act upon the seed in a more efficient manner than it otherwise would.

I do not claim, separately, any of the parts herein shown and described; but

I claim as new and desire to secure by Letters Patent—

The combination of the large cylinder B, small roller D, reciprocating plate G, feed-board L, doffer-plate J, and presser-roller F, all arranged and operating substantially as and for the purposes set forth.

JOHN STEVENS.

Witnesses:
 M. M. LIVINGSTON,
 C. L. TOPLIFF.